March 15, 1955 A. T. C. BURROWS 2,704,148
CONVEYOR SYSTEMS
Filed Dec. 13, 1951 4 Sheets-Sheet 1

INVENTOR
ARTHUR THOMAS CHARLES BURROWS
BY: Haseltine, Lake & Co.
AGENTS

March 15, 1955     A. T. C. BURROWS     2,704,148
CONVEYOR SYSTEMS
Filed Dec. 13, 1951     4 Sheets-Sheet 3

INVENTOR
ARTHUR THOMAS CHARLES BURROWS
BY:
Haseltine, Lake & Co.
AGENTS

March 15, 1955  A. T. C. BURROWS  2,704,148
CONVEYOR SYSTEMS
Filed Dec. 13, 1951  4 Sheets-Sheet 4

INVENTOR
ARTHUR THOMAS CHARLES BURROWS
BY: Haseltine, Lake & Co.
AGENTS

2,704,148

CONVEYOR SYSTEMS

Arthur Thomas Charles Burrows, Hitchin, England, assignor to Geo. W. King Limited, Hitchin, England, a British company Application December 13, 1951, Serial No. 261,500

Claims priority, application Great Britain December 15, 1950

1 Claim. (Cl. 198—88)

This invention relates to conveyor systems and has for its chief object to evolve such a system which will facilitate and speed up the loading and unloading of ships, vehicles and the like and will at the same time reduce the man power hitherto necessary for performing such operations.

According to the invention the system comprises a plurality of endless conveyors disposed in parallel relationship to each other and to the ship or vehicle to be loaded or unloaded, means adapted to convey loads from one or more of said conveyors to the ship or vehicle or vice versa, one or more additional conveyors arranged at an angle to said first mentioned conveyors and extending therefrom to a loading or unloading point while being capable of transporting loads to each of the first mentioned conveyors or vice versa and means whereby loads may be transferred as desired from or to the or each additional conveyor to or from any one of said first mentioned conveyors and from or to any of the latter conveyors to or from the ship or vehicle to be loaded or unloaded.

In order that the said invention may be clearly understood and readily carried into effect the same will be hereinafter more fully described with reference to the accompanying diagrammatic drawings, in which.

Figure 1:
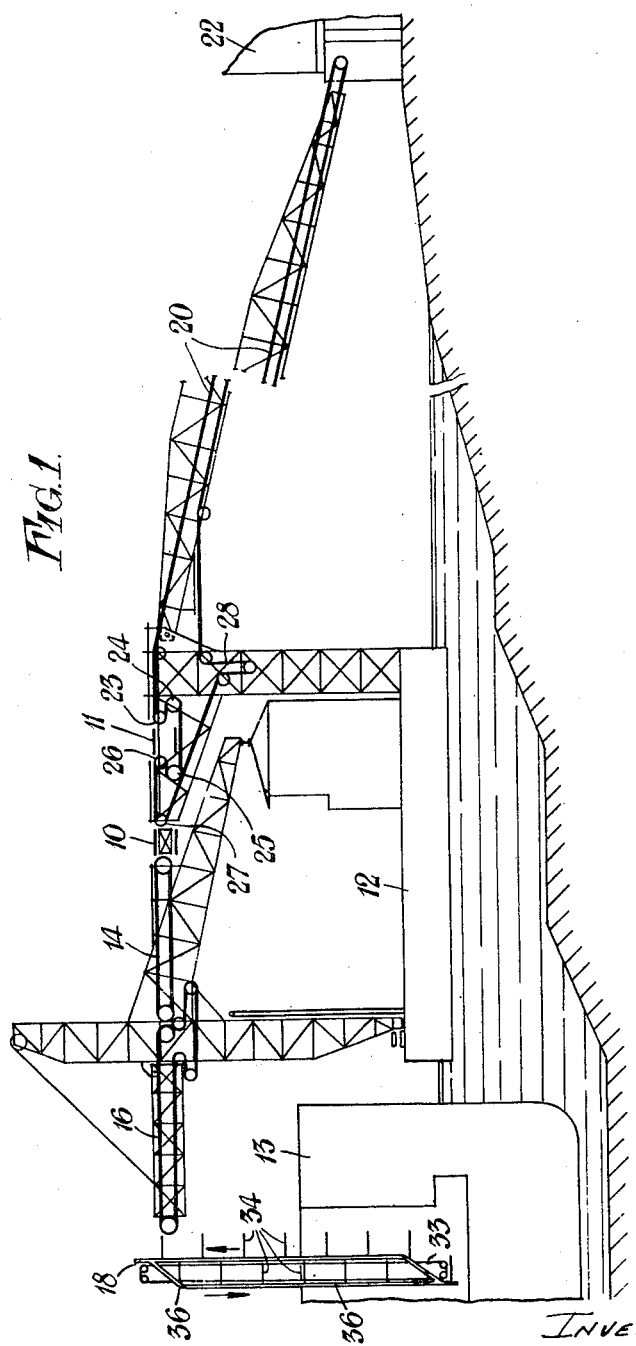
Figure 1 is a side elevational view of a conveyor system according to the invention.

Referring now to the drawings it will be seen that the conveyor system therein illustrated is intended for use in the loading or unloading of a ship which is moored alongside a wharf or pier. It will be appreciated however that such a use is purely exemplary and that the invention is not necessarily limited thereto.

The system illustrated includes two endless belt conveyors 10 and 11 which are mounted in a supporting structure or framework in such a manner as to extend in spaced parallel relationship to each other and to the side of a pier 12 against which a ship indicated at 13 is moored. In the embodiment illustrated the pier 12 is of the floating type such that it will be raised and lowered in accordance with the rise and fall of the tides. Also mounted on suitable frameworks or structures carried by the pier 12 are two endless belt conveyors 14 and 15, which extend at right-angles to the conveyors 10 and 11 and are directed towards that side of the pier 12 against which the ship is moored. It will be noted that the conveyor 14 extends from the conveyor 10 while the conveyor 15 extends from the conveyor 11 passing over the top of said conveyor 10. Disposed in alignment with the conveyors 14 and 15 are two further belt conveyors 16 and 17 each of which is made up of a plurality of narrow endless belts or bands disposed in spaced parallel relationship. The conveyors 16 and 17 are adapted to cooperate with load elevators 18 and 19 which are disposed in the holds of the ship each of such elevators being adapted to raise loads from the holds to the level of the conveyor 16 or 17 as the case may be or conversely to lower such loads from such upper level into said holds. The drives to the conveyors 14, 15 and 16, 17 are such that the direction of travel of said conveyors may be readily reversed depending upon whether the ship is to be loaded or unloaded. Preferably also the arrangement is such that the conveyors 14, 15 and 16, 17 are capable of a traverse motion, i. e. are movable in either direction lengthwise of the belts 10 and 11 and of the ship in order that they may be positioned appropriately in regard to the holds which it is required to load or unload.

Figure 2:
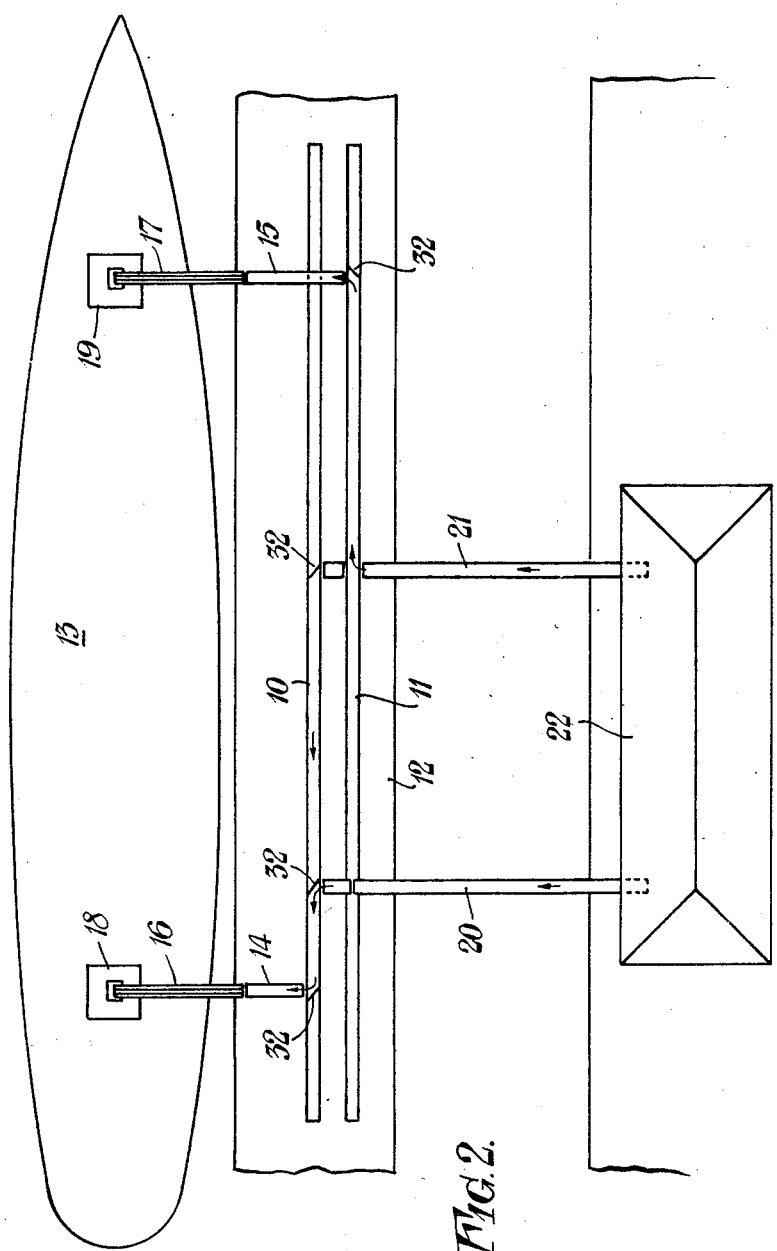
Figure 2 is a plan view showing the various conveyor belts employed.
Figure 3:
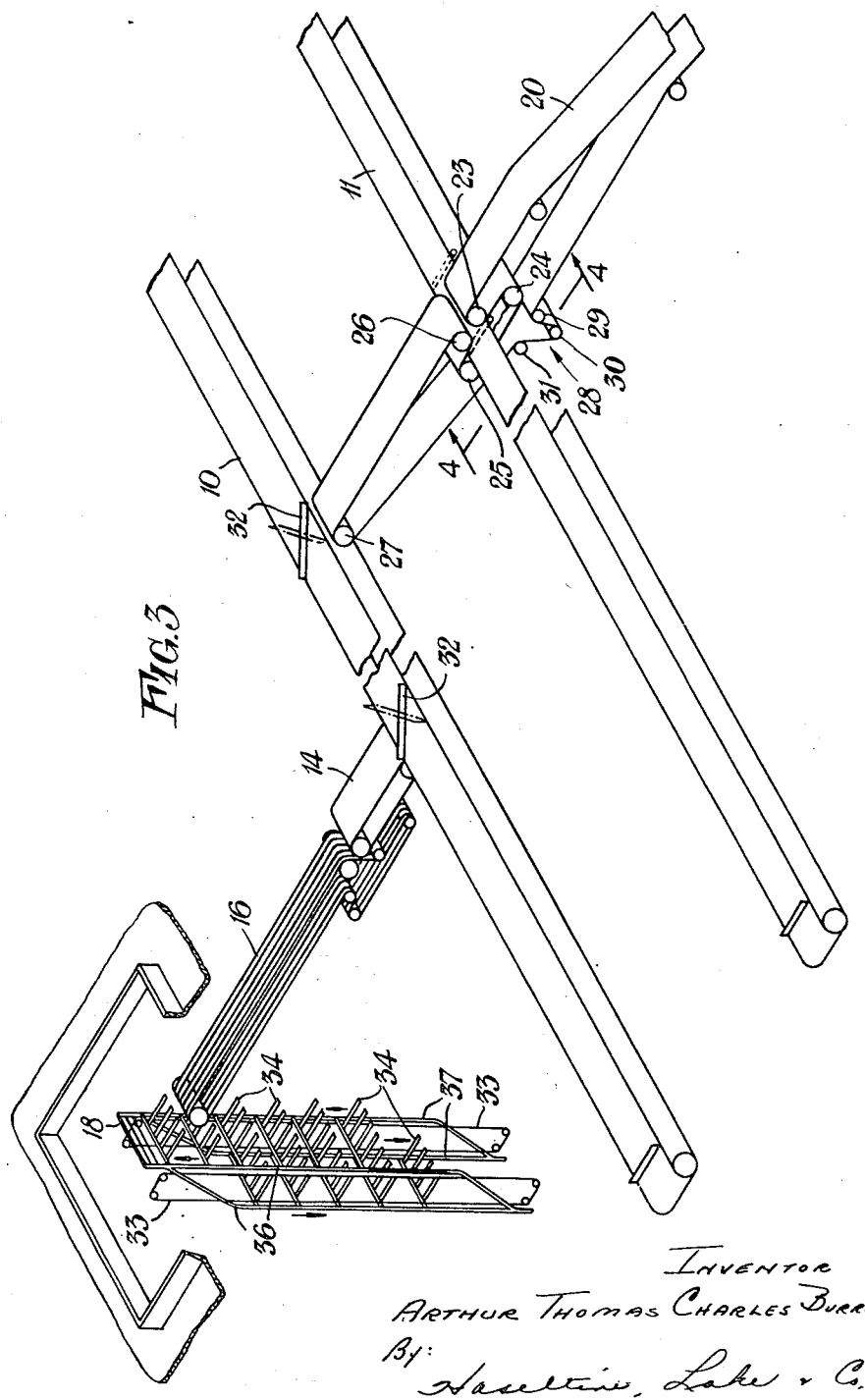
Figure 3 is a perspective view illustrating a portion of the system shown in Figures 1 and 2.
Figure 4:
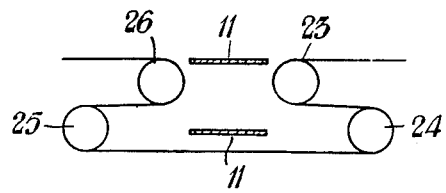
Figure 4 is a view taken on the line 4—4 of Figure 3.
Figure 5:
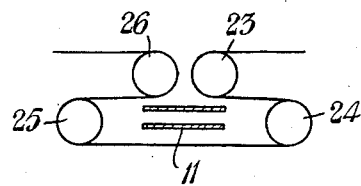
Figure 5 is a view similar to that of Figure 4 but illustrating the manner in which two conveyor belts may be adjusted relatively to each other.

In order to pick up or discharge loads from or on to the conveyors 10 and 11 two additional endless belt conveyors 20 and 21, hereinafter termed "delivery conveyors" are provided, said delivery conveyors leading from said conveyors 10 and 11 and from the floating pier 12 to a baggage hall or other primary loading or unloading station indicated at 22 and hereinafter referred to briefly as "the station" such station being located ashore. Each delivery conveyor extends from the conveyor 10 to the station 22 and means are incorporated therein at the intersection thereof with the conveyor 11 whereby said delivery conveyor may be adjusted either to convey loads over the top of said latter conveyor straight to or from the conveyor 10 or alternatively to deliver loads to or receive loads from said conveyor 11. At the point of intersection of each delivery conveyor with the conveyor 11 two sets of pulleys or the like, 23, 24 and 25, 26 are provided which are disposed at opposite sides of said conveyor and are arranged to rotate about axes parallel to each other and to the longitudinal axis of the conveyor 11. Starting from the station and assuming that the delivery conveyors are travelling towards the ship the top flight of each delivery conveyor is led around the pulley 23 and thence backwardly, in a direction parallel to said top flight, around the pulley 24 whence it passes forwardly beneath the conveyor 11 and around the pulley 25 which is disposed at the same level as and parallel to the pulley 24. From the pulley 25 the conveyor belt passes backwardly and around the pulley 26 disposed at the other side of said conveyor 11 and thence onwardly and around a pulley 27 disposed adjacent the upper flight of the conveyor 10. The four pulleys 23–26 referred to above are so arranged that in the event that loads are to be conveyed directly to or from the conveyor 10, said pulleys will be moved in such a manner as to bring the pulleys 23 and 26 into proximity to one another at a level above that of the top flight of the conveyor 11 as illustrated in Figures 2, 3 and 5, thereby to bring the two portions of the upper flight of the delivery conveyor which are at opposite sides of said conveyor 11 into proximity and to provide the equivalent of a continuous belt whereon loads will be conveyed over the top of said conveyor 11. The arrangement is also such that in the event that loads are to be conveyed to or from the conveyor 11, the aforesaid pulleys will be moved outwardly relatively to each other and into a position wherein the pulleys 23 and 26 will be level or substantially level with the upper flight of the conveyor 11, while being also disposed in proximity to the opposite edges of said upper flight as is indicated in Figures 1 and 4. The pulleys 24 and 25 are adapted to serve as compensating pulleys and are capable of relative movement of such a nature as to maintain the required degree of tension on the delivery conveyor belt at all times. In order to allow for the movement of the pulleys 23 and 26, it is necessary at the same time to arrange for the upper flight of the conveyor 11 to be raised or lowered at will. Thus when loads are to be conveyed direct to or from the conveyor 10 and over the conveyor 11, the top flight of the latter will be lowered, the pulleys 23 and 26 being thereafter moved inwardly relatively to each other in order to provide a substantially continuous conveyor band over the top of said conveyor 11. Alternatively when loads are to be conveyed to or from the conveyor 11 the two pulleys 23 and 26 will be moved outwardly relatively to each other and the top flight of the conveyor 11 will then be raised to the level of the two sections of the delivery conveyor as determined by said two pulleys.

Figure 6:
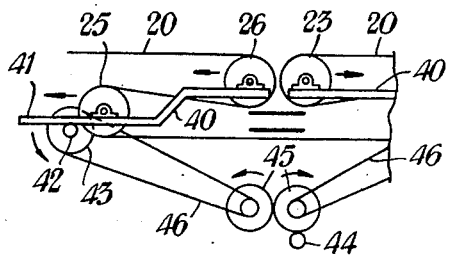
Figures 6, 7 and 7A show certain details of construction.
Figure 7:
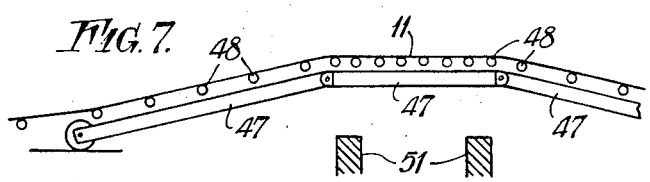
Figure 7A:
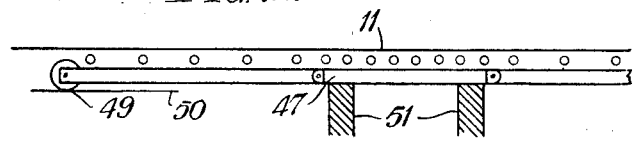

In Figures 6 and 7 and 7A, means are indicated for effecting the requisite movements of the pulleys 23–26 and also of the upper flight of the conveyor 11.

Referring now to Figure 6 it will be seen that each pair of pulleys 23 and 24 and 25 and 26 is mounted on a frame or carrier 40, a portion 41 of the latter having a rack formed thereon or associated therewith. Meshing with the aforesaid rack is a pinion 42 which is associated with a gear wheel 43 to which a drive is imparted from a reversible motor or other means 44 by way of spur gearing 45 and an endless chain or the like 46.

From Figures 7 and 7A it will be seen that in the region of each of the conveyors 20 or 21 the belt 11 may be caused to pass over an articulated frame or support 47 which carries a plurality of freely rotatable rollers or pulleys 48. Mounted at the outer or free ends of the end sections of the frame or support 47 are freely rotatable rollers 49 which are adapted to run on a rigid supporting surface 50. Disposed below the central section of the frame or support 47 is a thruster mechanism indicated at 51 which is adapted on operation to cause the central section of said frame or support to be raised from its lowermost position indicated in Figure 7A to its uppermost position indicated in Figure 7 and vice versa thereby to effect raising and lowering of the upper flight of the conveyor 11.

The lower flight of each delivery conveyor passes underneath the lower flight of the conveyor 11 and suitable compensating gear designated generally by 28 (Figures 1 and 3) is incorporated therein to allow for general tensioning of the belt and also to allow for differences in tide levels and for consequent vertical movement of the floating pier 12. In the embodiment illustrated the lower flight of each delivery conveyor is, at a convenient point in its path of movement, led around a pulley 29 and thence downwardly around a compensating roller 30 which is capable of vertical adjustment and finally upwardly and around a further pulley 31 which is parallel to the pulley 29.

Suitable deflector members or ploughs 32 are located at each junction or cross over point between the delivery conveyors and the conveyors 10 and 11 and between the latter and the conveyors 14 and 15, means being provided whereby said deflector members or ploughs may be positioned as required to divert or guide baggage from one conveyor to another. The deflector members or ploughs 32 may each conveniently comprise a row of rollers or the like which are mounted for free rotation about vertical spindles carried by a suitable holder or frame member or small belt conveyors or the like mounted on pulleys having their axes vertical. Further the conveyors 10 and 11 may each be provided, at the junction with the appropriate conveyor 14 or 15, with a set of rollers or the like which are capable of vertical movement as and when required in order to raise or lower the upper flight of the conveyor 10 or 11, into or from a position wherein it will be level with the conveyor 14 or 15 to allow passage of baggage from one to the other. Obviously the arrangement may be such that the conveyors 14, 15 and also the conveyors 20 and 21 will normally be above, level with or below the upper flights of the belts 10 and 11, suitable means being provided where necessary to allow for the requisite load transfer.

By suitable manipulation of the drives to the various conveyors incorporated in the system it is possible to deliver loads to and to discharge loads from the holds of the ship from or to the baggage hall or station without the necessity for any manhandling of such loads during transit. For example a load may be conveyed from the baggage hall or station 22 either straight to the conveyor 10 and thence to the conveyor 14, or to the conveyor 11 and thence either to the conveyor 15 or to the conveyor 10 and finally to the conveyor 14 associated therewith. Similarly in the case of unloading the load may be transferred on to the conveyor 11 and thence on to a delivery conveyor 20 or 21 or to the conveyor 10 and thence either directly or via the conveyor 11 to a delivery conveyor. It will also be appreciated that if desired goods from the conveyors 14 and 15 may be off loaded at the ends of the conveyors 10 and 11 and similarly goods intended for either of said conveyors 14 and 15 may be unloaded at the ends of said conveyors 10 and 11.

In the embodiment illustrated each of the elevators 18 and 19 comprises a pair of endless driving chains 33 which are disposed in spaced parallel relationship and are adapted to impart a drive to a plurality of load carrying trays 34 the latter being thereby moved around a predetermined path or circuit. Each of the trays 34 is guided and supported in its required path by virtue of the provision thereon of a series of rollers which are adapted to engage and run on two rigid vertical tracks 36 and 37 the latter being disposed in spaced parallel relationship and each being so constructed and arranged as to provide separate downward and upward paths (indicated by arrows) such paths merging at their upper and lower ends into a single path. At the points of junction of the two paths in each of the tracks 36 and 37 suitable spring loaded switch tongues may be provided to ensure appropriate passage of the trays 34 around the required circuit. The arrangement is such that the trays 34 will be maintained horizontal at all times even when travelling on inclined sections of the tracks 36 and 37. In the embodiment illustrated each tray comprises a plurality of spaced prongs or the like which are adapted on appropriate positioning of the conveyor 16 or 17 to project into the spaces between the separate belts of such conveyor. It should be mentioned here that to facilitate load transfer the conveyors 16 and 17 may be so constructed that they are capable of extension and retraction, the arrangement being such that when load transfer to or from the elevator is required the conveyor 16 or 17 may be extended or projected so that the prongs of a load tray will lie in between the belts of said conveyor. If desired the prongs on the trays may have one or more freely rotatable rollers thereon to assist in the movement of loads thereover. The elevator construction indicated is purely exemplary and if desired any other suitable elevator system may be employed which may or may not involve the necessity for constructing the conveyors 16 and 17 in such a manner that they are capable of extension and retraction.

It will be obvious that the system above described may be varied in many respects for example the number of elevators and conveyors such as 14, 15, 16 and 17 may be varied with or without a corresponding variation in the number of parallel belt conveyors on the wharf or pier or of the delivery conveyors. Again instead of endless belt conveyors it may be feasible to employ conveyors of the slat or other similar type.

I claim:

In a conveyor system to be employed for loading or unloading ships or vehicles the provision of a first endless conveyor band, a second endless conveyor band disposed substantially at right-angles to the first and having a first and a second portion located respectively at opposite sides of said first conveyor band, means for moving the opposed ends of said first and second portions of said second conveyor band horizontally from first positions wherein they are vertically aligned with the opposite edges of said first conveyor band to second positions wherein they are adjacent one another, and means for varying the level of the upper flight of said first conveyor band so that said upper flight is level with said first and second portions, when the latter are in said first positions thereof, and said upper flight is disposed below said first and second portions, when the latter are in said second positions thereof to bridge over said first conveyor band, whereby articles can be transferred from said conveyor band to said first conveyor band and from said first conveyor band to said second conveyor band when said first and second portions of the latter are in said first positions thereof.

References Cited in the file of this patent

UNITED STATES PATENTS

| | | |
|---|---|---|
| 404,658 | Russell | June 4, 1889 |
| 995,379 | Schwab | June 13, 1911 |
| 1,313,928 | Stuart | Aug. 26, 1919 |
| 1,525,950 | Prescott | Feb. 10, 1925 |
| 2,108,869 | Sandmeyer | Feb. 22, 1938 |
| 2,216,685 | Caesar | Oct. 1, 1940 |
| 2,331,613 | Lienau | Oct. 12, 1943 |
| 2,549,370 | Ernst | Apr. 17, 1951 |

FOREIGN PATENTS

| | | |
|---|---|---|
| 487,518 | Germany | Dec. 14, 1929 |
| 5,541 of 1931 | Australia | Jan. 6, 1933 |